US009265173B1

(12) United States Patent
Jhang et al.

(10) Patent No.: US 9,265,173 B1
(45) Date of Patent: Feb. 16, 2016

(54) STORAGE DEVICE SLOW DESCENT STRUCTURE

(71) Applicant: AIC INC., Taoyuan Hsien (TW)

(72) Inventors: Fu-An Jhang, Taoyuan Hsien (TW); Ta-Chih Chung, Taoyuan Hsien (TW)

(73) Assignee: AIC INC., Taoyuan Hsien (TW)

( * ) Notice: Subject to any disclaimer, the term of this patent is extended or adjusted under 35 U.S.C. 154(b) by 0 days.

(21) Appl. No.: 14/533,091

(22) Filed: Nov. 5, 2014

(51) Int. Cl.
*A47B 51/00* (2006.01)
*H05K 7/14* (2006.01)
*G06F 1/18* (2006.01)

(52) U.S. Cl.
CPC .............. *H05K 7/1489* (2013.01); *G06F 1/187* (2013.01)

(58) Field of Classification Search
CPC ...... A47B 51/00; A47B 46/005; A47B 88/16; A47B 88/06; A47B 63/06; A47B 63/065; H04Q 1/021; H04Q 1/023; H04Q 1/09; H04Q 2201/08; H05K 7/1421
USPC ............... 108/106–108; 312/330.1, 298, 302, 312/303, 319.3, 323, 32; 361/724–727
See application file for complete search history.

(56) References Cited

U.S. PATENT DOCUMENTS

| 264,748 | A | * | 9/1882 | Potts | ....................... | A47B 53/02 |
| | | | | | | 312/201 |
| 1,015,722 | A | * | 1/1912 | Bezold | ................... | A47B 63/02 |
| | | | | | | 211/43 |
| 1,781,624 | A | * | 11/1930 | Barnes | ...................... | B65D 5/38 |
| | | | | | | 206/278 |
| 2,238,004 | A | * | 4/1941 | Wolters | .................. | A47B 63/02 |
| | | | | | | 312/303 |
| 2,268,917 | A | * | 1/1942 | Abelmann | .............. | A47B 88/06 |
| | | | | | | 126/340 |
| 6,685,033 | B1 | * | 2/2004 | Baddour | .................. | G06F 1/183 |
| | | | | | | 211/175 |
| 7,259,325 | B2 | * | 8/2007 | Pincu | ....................... | H04Q 1/02 |
| | | | | | | 174/50 |
| 7,748,803 | B2 | * | 7/2010 | Bazany | ................. | A47F 5/0093 |
| | | | | | | 108/143 |
| 7,770,986 | B1 | * | 8/2010 | Simaitis | ............... | A47B 46/005 |
| | | | | | | 312/246 |
| 8,424,693 | B1 | * | 4/2013 | Hoover | .................. | A47F 5/0062 |
| | | | | | | 211/126.15 |
| 9,030,827 | B2 | * | 5/2015 | Jau | ........................... | G06F 1/16 |
| | | | | | | 211/49.1 |
| 2002/0181197 | A1 | * | 12/2002 | Huang | ................. | H05K 7/1421 |
| | | | | | | 361/679.39 |
| 2013/0081422 | A1 | * | 4/2013 | Park | ....................... | F25D 11/00 |
| | | | | | | 62/448 |
| 2013/0342990 | A1 | * | 12/2013 | Jau | ........................... | G06F 1/18 |
| | | | | | | 361/679.39 |

FOREIGN PATENT DOCUMENTS

JP          2002261461     *   9/2002

* cited by examiner

*Primary Examiner* — Janet M Wilkens
(74) *Attorney, Agent, or Firm* — Chun-Ming Shih; HDLS IPR Services

(57) ABSTRACT

A storage device slow descent structure includes a chassis (100) and an elevating element (200). The chassis (100) includes a front load plate (110), a rear load plate (120), and a sliding unit (130). An end portion (132) of the sliding unit (130) is slidably connected to one side of the rear load plate (120). The elevating element (200) includes two linkages (210) respectively having a front end (212) and a rear end (214). The two linkages (210) are respectively connected to the front load plate (110) and the end portion (132). The rear end (214) is pivotally connected to the slide member (134). The front end (212) is pivotally connected to the front load plate (110). A self-weight of the front load plate (110) drives the rear end (214) to slide from one end to the other end of the slide member (134).

8 Claims, 5 Drawing Sheets

STORAGE DEVICE SLOW DESCENT STRUCTURE

BACKGROUND

1. Technical Field

The present invention relates to a storage device slow descent structure and, in particular, to a storage device slow descent structure for loading a hot-swappable hard disk.

2. Related Art

In general, hot-swappable devices of a server include a hot-swappable power source, a hot-swappable hard disk, a hot-swappable battery, and a hot-swappable fan. These hot-swappable devices are usually installed on the panel side and/or the rear side, so as to facilitate instant replacement of the hot-swappable devices from the panel side and/or the rear side. The hot-swappable devices usually include a handle for holding and a rear latch for positioning. Hot-swapping herein is a term used to describe the action of physically connecting or disconnecting peripheral equipments without shutting down the computer system. The hot-swapping function plays an important role especially in server system application, which can allow adding components or performing other works to the computer system without stopping the services of the computer system.

According to conventional techniques, when the server system uses hard disks extensively, usually a chassis of a cabinet includes load plates at a front row and a rear row, which are connected to each other by sliding rails at two sides. A hollow space is formed between the two load plates to facilitate replacement or disassembly/assembly of a storage device. When the storage device of the chassis is in a higher position, a tray of the chassis is withdrawn by a worker to pass through the hollow space between the two load plates, so as to disassemble/assemble the storage device at the rear row. To replace or check the storage device at the front row, the work has to move to be in front of the server cabinet to disassemble/assemble or repair the storage device at the front row.

In order to improve the above-mentioned problems, a solution which can more efficiently solve the problems should be sought to facilitate assembly, disassembly, or replacement of the hard disks of the server system.

BRIEF SUMMARY

It is an object of the present invention to provide a storage device slow descent structure which facilitate assembly and disassembly of a storage device.

Accordingly, the present invention provides a storage device slow descent structure comprising a chassis and an elevating element. The chassis includes a front load plate, a rear load plate, and a sliding unit. A gap is formed between the front load plate and the rear load plate. An end portion of the sliding unit is slidably connected to one side of the rear load plate, wherein the end portion of the sliding unit further includes a slide member. The elevating element includes two linkages respectively having a front end and a rear end, the two linkages are respectively connected to two sides of the front load plate and the end portion of the sliding unit. The rear end of each of the linkages is pivotally connected to one end of the slide member of the sliding unit. The front end is pivotally connected to a side edge of the front load plate. A self-weight of the front load plate drives the rear end of each of the linkages to slide from one end to the other end of the slide member, so as to expose the rear load plate.

The present invention further provides features as follows. The elevating element further includes a connecting rod, an auxiliary linkage, and a damper, thereby improving the consistency and stability when the front load plate ascends or descends with respect to the rear load plate.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present invention provides a storage device slow descent structure which can be used to load a storage device which is disposed in a server. The storage device is, for example, a hard disk, but the hard disk is not limited to 3.5-inch, 2.5-inch, or 1.8-inch hard disks. Especially, the storage device slow descent structure of the present invention can be used to load any hot-swappable storage device. In other words, the structure of the present invention encompasses any storage device to which power and signals are continuously supplied when a load plate is withdrawn from a cabinet. In the following, detailed descriptions along with accompanied drawings are given to better explain the features and technical contents of the present invention. However, the following descriptions and the accompanied drawings are for reference and illustration only, and are not intended to limit the scope of the present invention.

Figure 1:
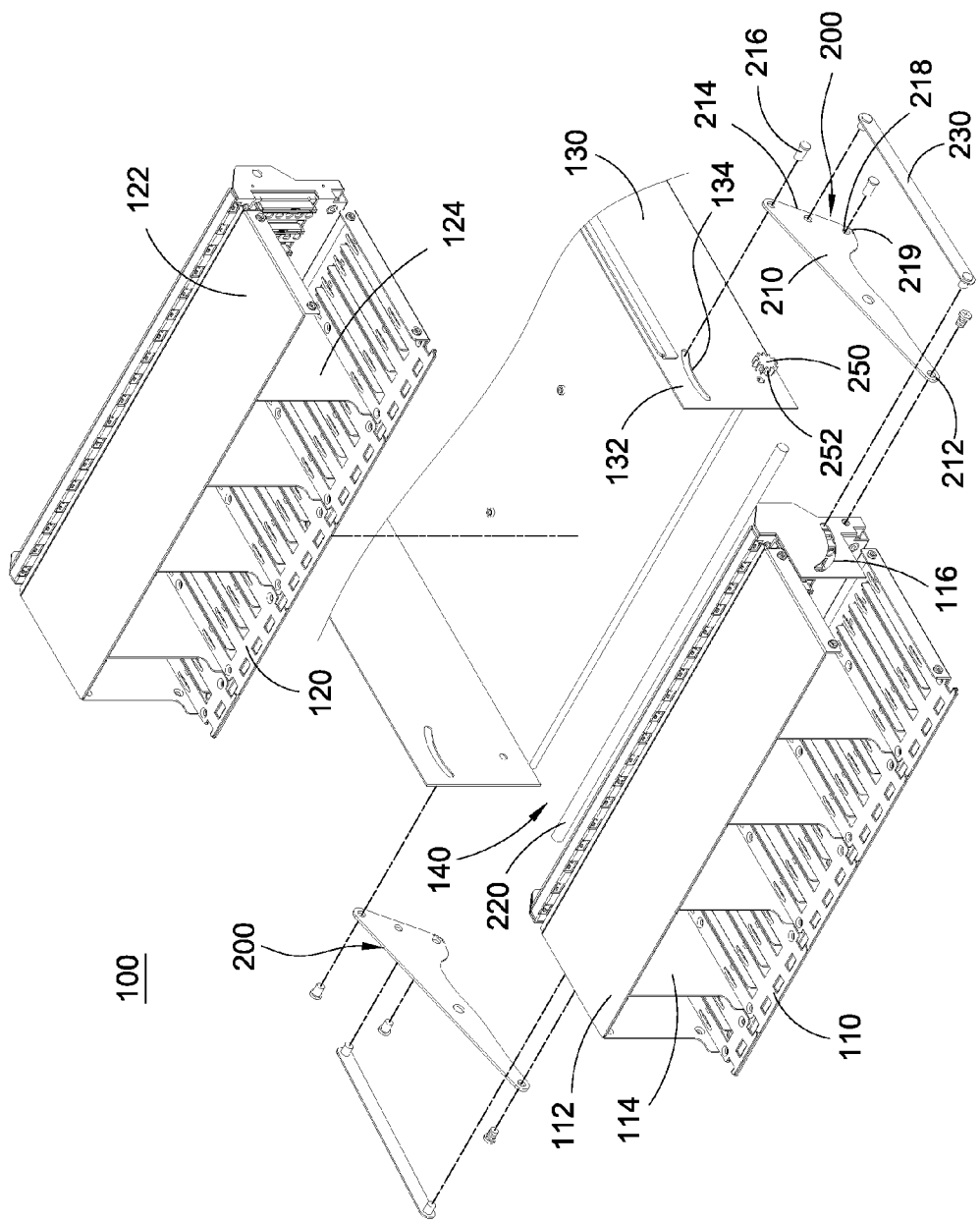
FIG. 1 is a partially exploded view of a storage device slow descent structure according to the present invention.
Figure 2:
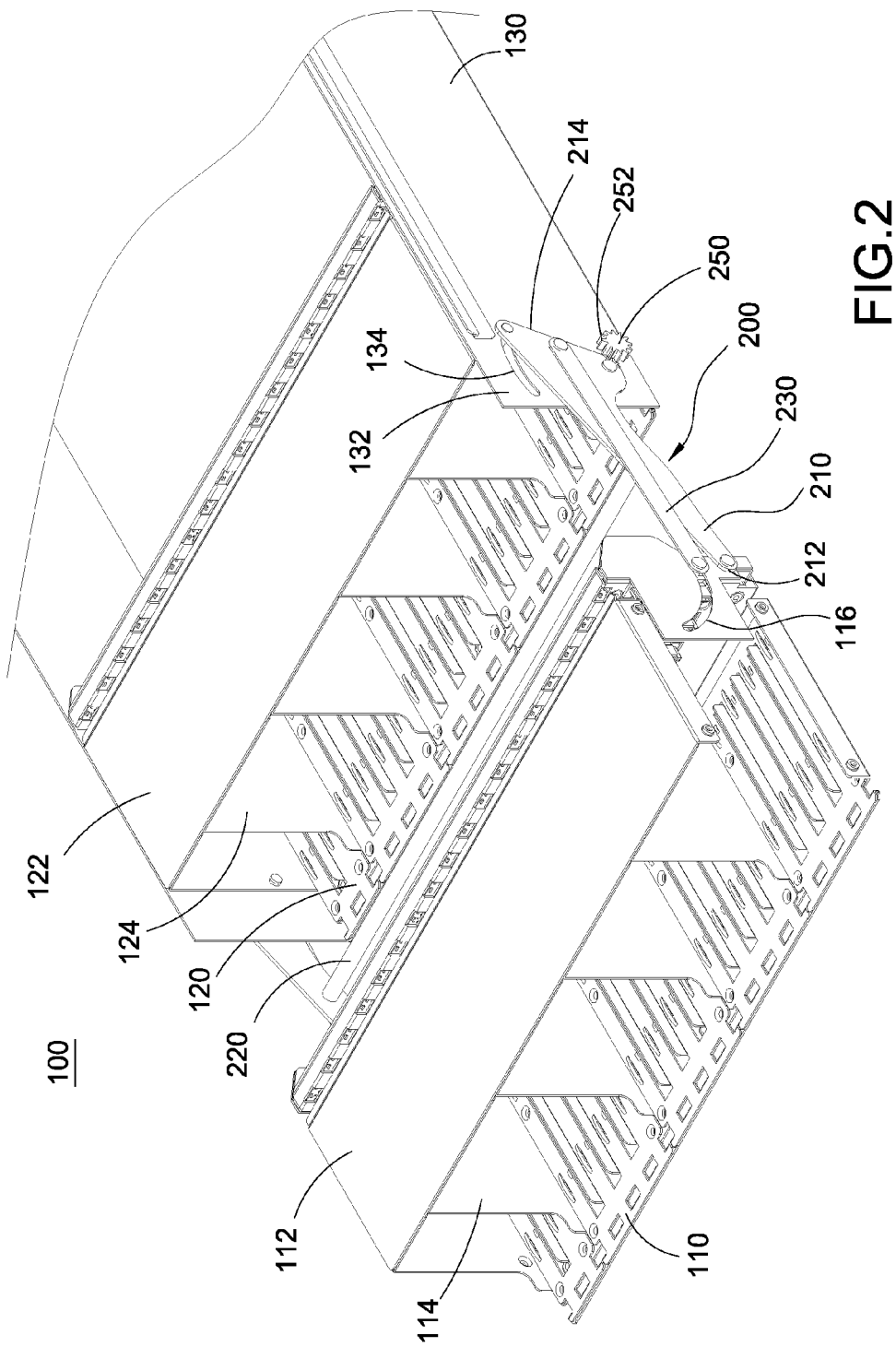
FIG. 2 is a partially assembled view of the storage device slow descent structure according to the present invention.
Figure 3:
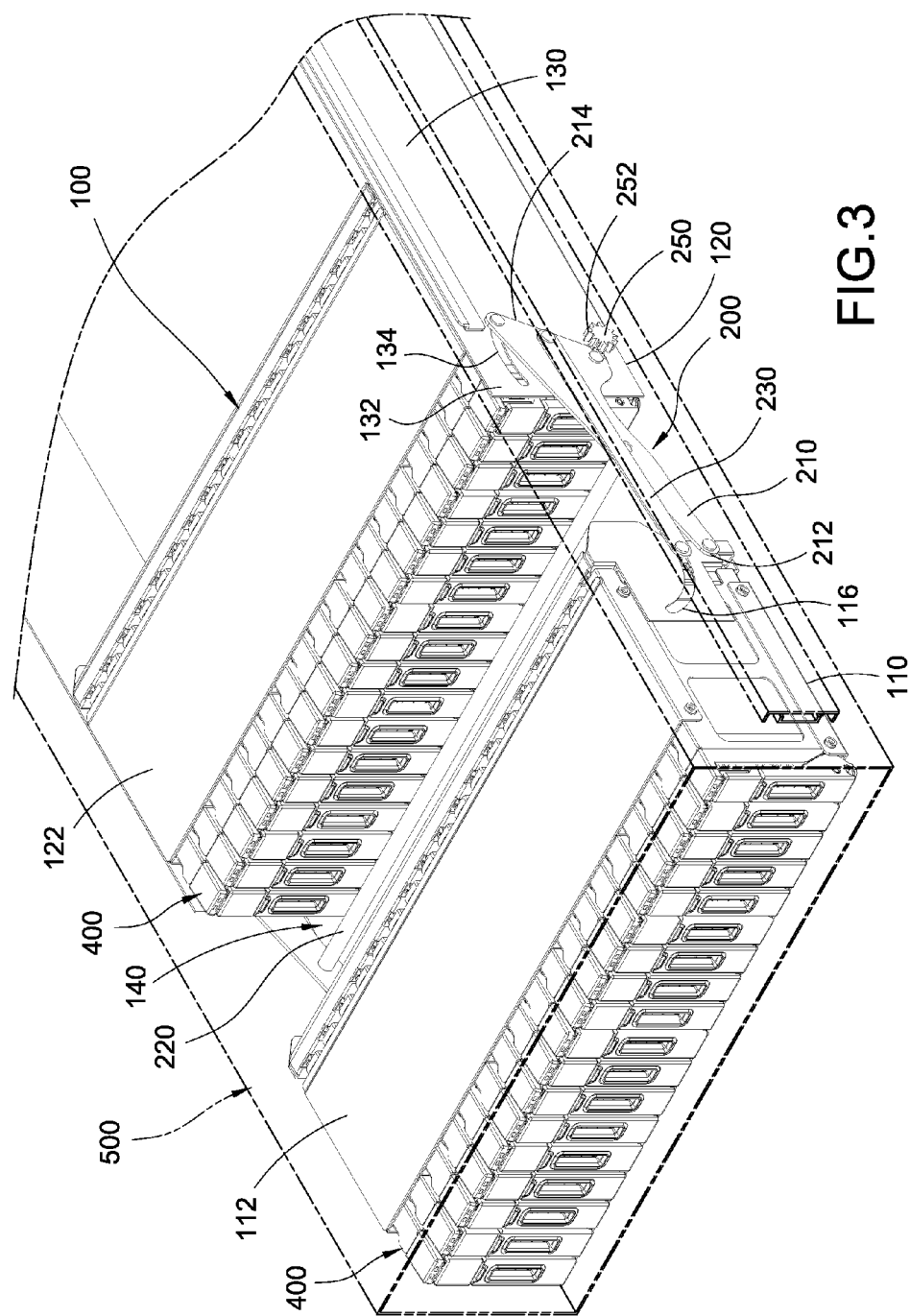
FIG. 3 is a schematic view illustrating that the storage device slow descent structure is received in the chassis according to the present invention.

Referring to FIGS. 1 to 5, the present invention provides a storage device slow descent structure which is mainly used in a cabinet of a server. The cabinet 500 includes a plurality of chassis 100. The chassis 100 are slidably received in the cabinet 500. However, in another embodiments, the storage device slow descent structure can be applied to a telecom cabinet, a computer system, or other suitable devices. As shown in FIGS. 1 and 2, the storage device slow descent structure includes a chassis 100 and an elevating element 200. The chassis 100 includes a front load plate 110, a rear load plate 120, and a sliding unit 130. A gap 140 is formed between the front load plate 110 and the rear load plate 120. The gap 140 facilitates assembly and disassembly of a storage device (not illustrated) by a user. An end portion 132 of the sliding unit 130 is slidably connected to one side of the rear load plate 120. Usually the sliding unit 130 is disposed at two sides of the chassis 100 and has an inner sliding rail and an outer sliding rail. The rear load plate 120 is connected to the inner and outer sliding rails which are relatively movable with respect to each other, so as to drive the front load plate 110 to be slidably received in the chassis 100, as shown in FIG. 3. According to the embodiment shown in FIGS. 1 and 2, the end portion 132 of the sliding unit 130 further includes a slide member 134. The slide member 134 herein is preferably a curved slot directly formed on the end portion 132 of the sliding unit 130. However, in other embodiments, the slide member 134 may be an assembled catching groove or other suitable components, which is not limited by the present invention.

Furthermore, the present invention further includes a front replacement rack 112 and a rear replacement rack 122. The front replacement rack 112 and the rear replacement 122 are assembled to the front load plate 110 and the rear load plate 120, respectively. The front replacement rack 112 and the rear replacement rack 122 respectively include a plurality of partitions 114,124. The partitions 114, 124 can position the storage device (not illustrated) or achieve other functions.

Figure 4:
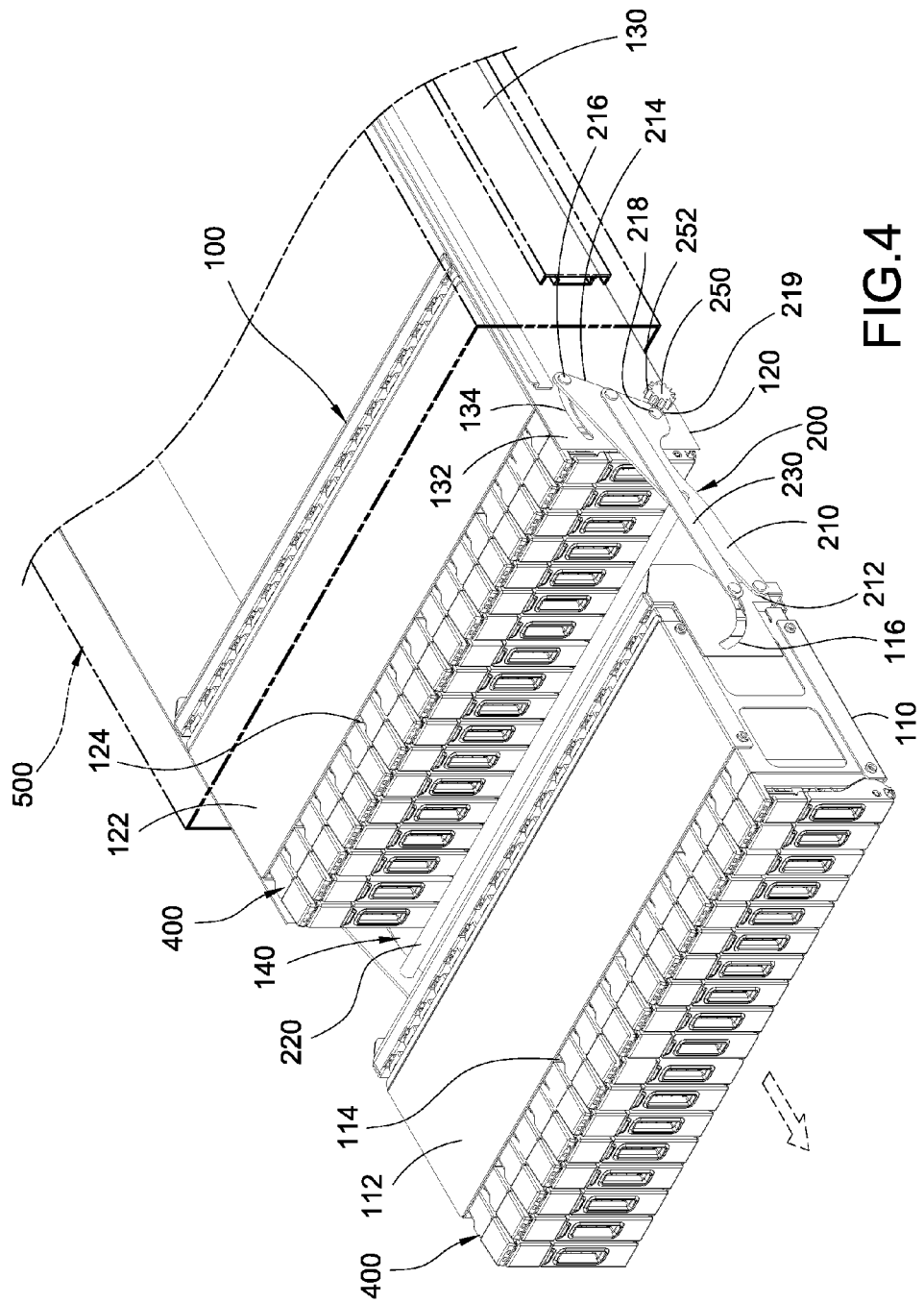
FIG. 4 is a schematic operation view illustrating that a chassis of the storage device slow descent structure is withdrawn from a cabinet.
Figure 5:
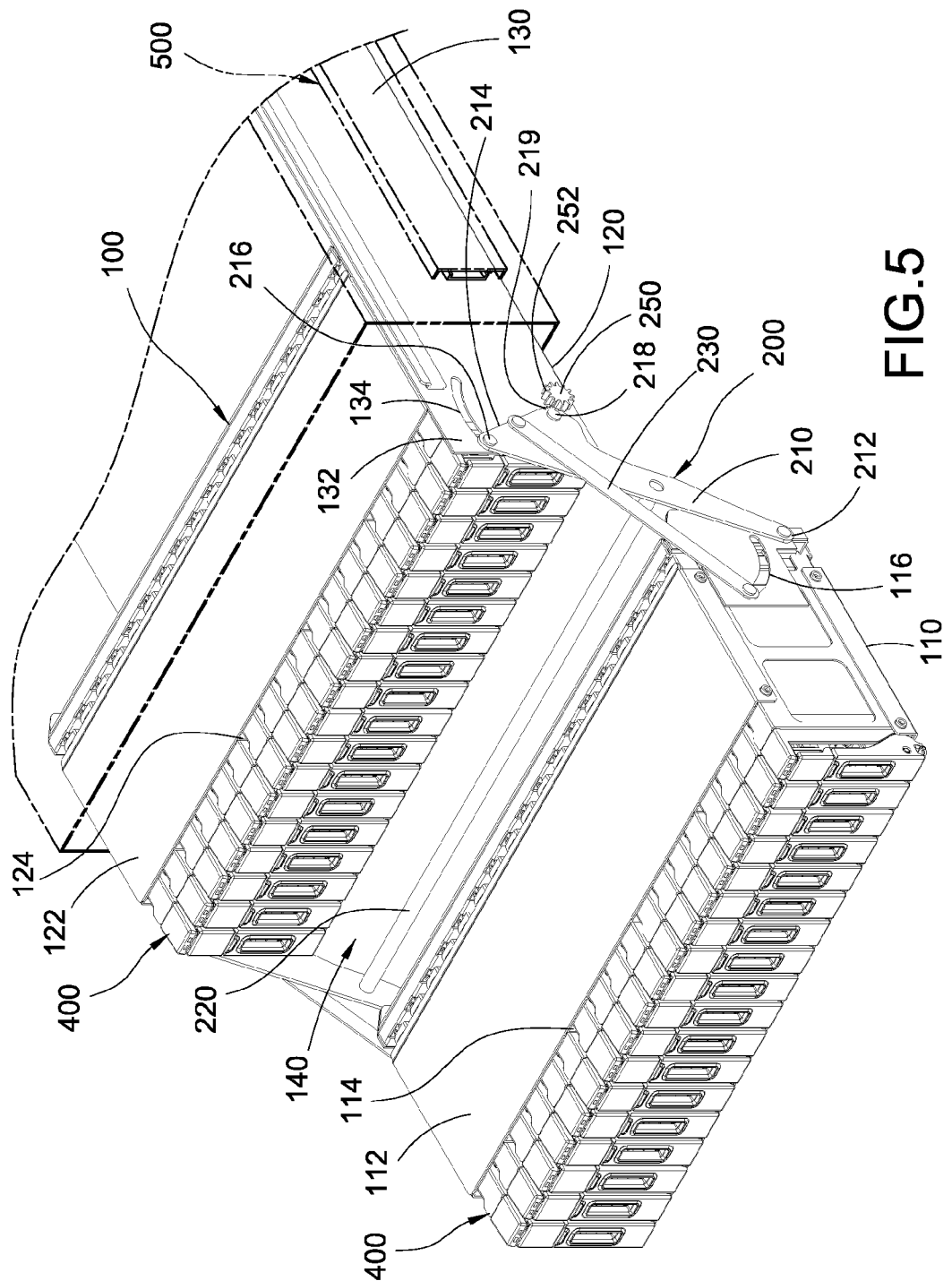
FIG. 5 is a schematic operation view illustrating that a front load plate moves downwardly with respect to a rear load plate, i.e. a schematic operation view exposing a front edge of the rear load plate. 4.

Referring to FIGS. 3 and 4, the elevating element 200 includes two linkages 210 respectively having a front end 212 and a rear end 214. Each of the linkages 210 is respectively connected to a side edge of the front load plate 110 and one side of the end portion 132 of the sliding unit 130. The rear end 214 of each of the linkages 210 is pivotally connected to one end of the slide member 134 of the sliding unit 130. The front end 212 is pivotally connected to a side edge of the front load plate 110. As shown in FIG. 4, each linkage 210 is preferably in a plate shape to provide better rigidity. The rear end 214 is greater in size than the front end 212. The rear end 214 further includes a sliding shaft 216 and a fixed rotation shaft 218. The sliding shaft 216 or the fixed rotation shaft 218 may be a bolt, a rivet, or other suitable means to be positioned in the end portion 132. The sliding shaft 216 is further slidable in the slide member 134 and rotates with respect to the fixed rotation shaft 218.

When the chassis 100 is withdrawn from the cabinet 500, the front load plate 110 loads a plurality of storage devices 400 and has a certain weight and volume. Therefore, due to the self-weight of the front load plate 110, the front load plate 110 slides from one end of the slide member 134 to the other end of the slide member 134 by means of the rear end 214 of each of the linkages 210, thereby moving to a down position with respect to the rear load plate 120 to expose a front edge of the rear load plate 120.

In order to enhance the consistency and stability, when the rear load plate 110 ascends or descends with respect to the rear load plate 120, the elevating element 200 further includes a connecting rod 220, an auxiliary linkage 230, and a damper 250. The connecting rod 220 passes through the gap 140 to respectively connect the two linkages 210, so that the two sides of the front load plate 110 may move without deflection, and thereby the two sides of the front load plate 110 may ascend or descend synchronously. One end of the auxiliary linkage 230 is disposed corresponding to the end portion 132 and connected to the rear end 214 of the linkage 210. The other end of the auxiliary linkage 230 is disposed adjacent to the front end 212 and connected to the side edge of the front load plate 110. According to the embodiment shown in FIG. 4, it is preferable that one end of the auxiliary linkage 230 is disposed between the sliding shaft 216 and the fixed rotation shaft 218, and the other end of the auxiliary linkage 230 is disposed above an upper edge of the front end 212.

The damper 250 is disposed on the end portion 132 and is adjacent to the fixed rotation shaft 218 of the rear end 214. The damper 250 contacts a side edge of the rear end 214 of the linkage 210, so as to provide a force to slow down the descending linkage 210, and thereby the front load plate 110 may descend slowly. The damper 250 is a hydraulic damper which includes a gear wheel. The gear wheel is connected to a chamber (not illustrated), and a buffer effect to the movement of the elevating element 200 is produced by virtue of the resistance resulting from friction between fans and buffer oil in the chamber. Furthermore, a plurality of gear tooth portions 252 are disposed on an outer edge of the damper 250, and a plurality of tooth units 219 are formed at one side of each of the rear ends 214 of the two linkages 210. Each of the gear tooth portions 252 is provided for engaging with each of the tooth units 219 to drive the front load plate 110 to descend or ascend slowly and stably.

As shown in FIG. 4, a curved slot 116 is further formed on the side edge of the front load plate 110 and adjacent to the front end 212 of the connecting rod 210. One end of the auxiliary linkage 230 is further pivotally connected to one end of the curved slot 116, so as to slide in the curved slot 116. When the front load plate 110 exposes the front edge of the rear load plate 120, one end of the auxiliary linkage 230 slides from one end of the curved slot 116 (being close to the rear load plate 120) to the other end of curved slot 116 (being away from the rear load plate 120), so as to enable the front load plate 110 to rotate reversely. Therefore, the user does not need to move to achieve maintenance, disassembly, or assembly of the storage device 400 on the front load plate 110 and the rear load plate 120.

Similarly, after finishing disassembly or assembly of the storage device 400, the user only needs to push upwardly the front load plate 110, then the elevating element 200 drives the front load plate 110 to ascend slowly to be parallel to the rear load plate 120. At this time, the chassis 100 may be pushed toward the cabinet 500 to be received in the cabinet 500, as shown in FIGS. 3 and 4.

It is to be understood that the above descriptions are merely preferable embodiment of the present invention and not intended to limit the scope of the present invention. Equivalent changes and modifications made in the spirit of the present invention are regarded as falling within the scope of the present invention, and the scope of the present invention is defined by the appended claims.

What is claimed is:

1. A storage device slow descent structure, comprising:
a chassis (100), including a front load plate (110), a rear load plate (120), and a sliding unit (130), a gap (140) being formed between the front load plate (110) and the rear load plate (120), an end portion (132) of the sliding unit (130) being slidably connected to one side of the rear load plate (120), the end portion (132) of the sliding unit (130) further including a slide member (134); and
an elevating element (200), the elevating element (200) including two linkages (210) respectively having a front end (212) and a rear end (214), the two linkages (210) being respectively connected to two sides of the front load plate (110) and the end portion (132) of the sliding unit (130), the rear end (214) of each of the linkages (210) being pivotally connected to one end of the slide member (134) of the sliding unit (130), the front end (212) being pivotally connected to a side edge of the front load plate (110), wherein a self-weight of the front load plate (110) drives the rear end (214) of each of the linkages (210) to slide from one end to the other end of the slide member (134), so as to expose the rear load plate (120),
wherein the slide member (134) is a curved slot.

2. The storage device slow descent structure of claim 1, further comprising a front replacement rack (112) and a rear replacement rack (122), the front replacement rack (112) and the rear replacement (122) being assembled to the front load plate (110) and the rear load plate (120) respectively, the front replacement rack (112) and the rear replacement rack (122) respectively including a plurality of partitions (114,124).

3. The storage device slow descent structure of claim 1, wherein the elevating element (200) further includes a connecting rod (220), an auxiliary linkage (230), and a damper (250), the connecting rod (220) passes through the gap (140) to respectively connect the two linkages (210), one end of the auxiliary linkage (230) is disposed corresponding to the end portion (132) and connected to the rear end (214) of the linkage (210), the other end of the auxiliary linkage (230) is disposed adjacent to the front end (212) and connected to the side edge of the front load plate (110), and the damper (250) is disposed on the end portion (132) and contacts the rear end (214) of the linkage (210).

4. The storage device slow descent structure of claim 3, wherein each of the linkages (210) is in a plate shape, the rear end (214) is greater in size than the front end (212), the rear end (214) further includes a sliding shaft (216) and a fixed rotation shaft (218), and the sliding shaft (216) is movable in the slide member (134) and rotatable with respect to the fixed rotation shaft (218).

5. The storage device slow descent structure of claim 4, wherein one end of the auxiliary linkage (230) is disposed between the sliding shaft (216) and the fixed rotation shaft (218), and the other end of the auxiliary linkage (230) is disposed adjacent to one side of the front end (212).

6. The storage device slow descent structure of claim 3, wherein a curved slot (116) is further formed on the side edge of the front load plate (110) and is adjacent to the front end (212) of the linkage (210), and one end of the auxiliary linkage (230) is further pivotally connected to one end of the curved slot (116).

7. The storage device slow descent structure of claim 5, wherein when the front load plate (110) exposes a front edge of the rear load plate (120), one end of the auxiliary linkage (230) slides from one end of the curved slot (116) adjacent to the rear load plate (120) to the other end of the curved slot (116) away from the rear load plate (120).

8. The storage device slow descent structure of claim 1, wherein the elevating element (200) further includes a damper (250), the damper (250) is disposed at the end portion (132) and has a plurality of gear tooth portions (252) on an outer edge of the damper (250), a plurality of tooth units (219) are formed at one side of each of the rear ends (214) of the two linkages (210), and each of the gear tooth portions (252) is provided for engaging with each of the tooth units (219) to drive the front load plate (110) to descend or ascend slowly.

\* \* \* \* \*